(No Model.)
J. T. KISINGER, Sr.
ANIMAL TRAP.
No. 489,869. Patented Jan. 10, 1893.
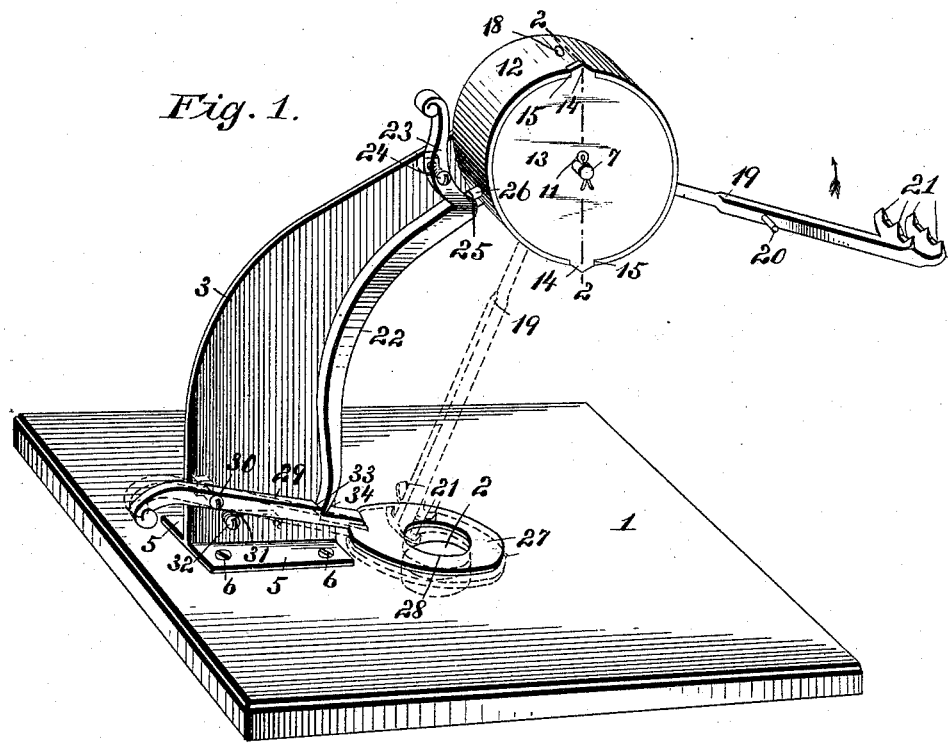
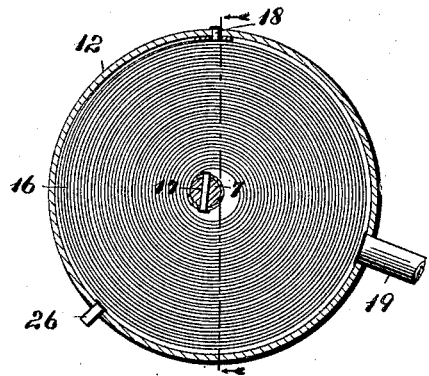
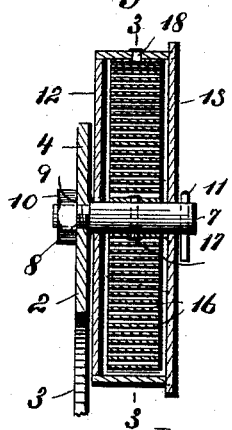
Witnesses:
F. G. Fischer
Jno. L. Coudron
Inventor:
John T. Kisinger, Sr.
By
Attys.

UNITED STATES PATENT OFFICE.

JOHN T. KISINGER, SR., OF BELTON, ASSIGNOR TO JOHN T. T. KISINGER, JR., AND LOREN G. ROWELL, OF KANSAS CITY, MISSOURI.

ANIMAL-TRAP.

SPECIFICATION forming part of Letters Patent No. 489,869, dated January 10, 1893.

Application filed June 6, 1892. Serial No. 435,785. (No model.)

*To all whom it may concern:*

Be it known that I, JOHN T. KISINGER, SR., of Belton, Cass county, Missouri, have invented certain new and useful Improvements in Animal-Traps, of which the following is a full, clear, and exact description, reference being had to the accompanying drawings, forming a part hereof.

My invention relates to appliances for capturing and killing rats, mice, and other animals, and the objects of my invention are to produce an animal-trap which shall be simple, compact, strong, and durable in construction, and rapid and effective in operation, and which shall instantly strike and kill the animal, as soon as the latter has sprung the trap. Furthermore, to produce an animal-trap which shall be self-setting after each operation, and capable of operating and of resetting itself repeatedly without attention from an operator.

To the above purposes my invention consists in certain peculiar and novel features of construction and arrangement, as hereinafter described and claimed.

In order that my invention may be fully understood, I will proceed to describe it with reference to the accompanying drawings, in which:

Figure 1 is a perspective view of an animal-trap embodying my invention; the trap being set in readiness for operation. Fig. 2 is a transverse vertical section of the same, on the line 2—2 of Fig. 1. Fig. 3 is a transverse vertical section of the same, on the line 3—3 of Fig. 2, and on a plane at right angles to the plane of section of Fig. 2.

In the said drawings 1 designates the base or bed-piece of the trap; the said base or bed-piece being of any suitable or preferred form and dimensions, and being also either of wood or of metal as desired.

As shown in the drawings, the base or bed-piece 1 is of rectangular form, and it is provided preferably at its middle, with a depression or cavity 2 which serves as a receptacle for the bait by which the animals are lured to the trap.

3 designates the standard of the trap, the said standard being of metal and extending obliquely upward and forward from the base 1, in goose-neck form, so as to bring the operative parts of the trap into proper working position, as hereinafter explained. At its upper end, the standard 3 is formed with a head or enlargement 4, for a purpose to be hereinafter explained, while at its lower end, said standard is formed with a foot 5 which extends longitudinally forwardly and rearwardly of the standard and also laterally at opposite sides of the same, as shown; the said foot being secured to the bed or base 1 by any suitable or preferred number of screws 6, and thus constituting a strong and rigid support for the standard.

Transversely through the head 4 extends rigidly a horizontal spindle 7 one end-portion 8 of which is formed square or angular so that said spindle shall not turn axially in the standard. The corresponding extremity of the spindle is externally screw-threaded to receive a nut 9 which abuts against the outer side of head or enlargement 4, and thus retains the spindle in proper operative connection with the standard. A shoulder 10 is formed upon this end of the spindle 7, said shoulder abutting against the inner side of the head or enlargement 4. A cylindrical casing 12 is mounted upon the spindle 7 so as to revolve thereon; the said spindle passing loosely through one side of the casing, at or near the center thereof, and also through the middle of the face-plate 13 of the casing; a split or spring key 11 is passed transversely through the outer end of the spindle 7 and serves to retain the casing 12 and its face-plate 13 in position upon the spindle 7. The margin of the face-plate 13 is preferably of cylindrical form, as shown, and said margin is formed with two, or any desired number of radial projections 14 which enter recesses 15 in the corresponding outer margin of the circular part of the casing 12; the arrangement being such that the face-plate 13 must turn with the casing 12, and may at the same time, be removed from said casing when so desired. In order to thus detach the face plate 13, from the casing 12, the free ends of the arms of the spring-key 11 are brought together and the key is drawn out of its opening in the spindle 7, after which the face-plate may be readily removed so as to afford access to the interior of the casing 12. Within this casing 12 is located a stout spiral spring 16, which is wound around the spindle 7. The inner end of this spring 16 is secured to the spindle 7 by a cross-pin 17 which passes transversely through the spindle, at a point about midway of the length of the same. The outer end of the spring 16 is secured to the circular portion or periphery of the casing 12 by a pin 18 which passes transversely through the outer end of the spring and radially through the periphery of the casing, as shown.

19 designates an arm which extends radially outward from the periphery of the casing 12, and which is formed at one side, and at a point about midway of its length, with a lateral stud or projection 20 which is designed to be grasped by the operator's hand while winding the spring 16, as hereinafter explained. At its outer end, the arm 19 is formed, or suitably provided, with a number of teeth 21, which project forwardly from the front side of the arm, and which may be arranged in two sets, as shown, or otherwise, as preferred, and of which there may be any greater or less number than that shown, as circumstances may suggest.

22 designates a long setting or trip-lever the body-portion of which is preferably of segmental form, as shown, and the upper portion 23 of which is also of segmental form but shorter than the body-portion of the lever and extending backward at an acute angle from the body-portion of the lever. This lever is pivotally connected to one side of the standard 3 by a screw 24, or an equivalent device, which passes horizontally through the upper portion 23 of the lever, about midway of the length of the same, and which also enters the corresponding side of the standard 3, at the upper portion thereof. At the point of juncture of the lower end of the upper segmental portion 23 of the trip-lever 24 with the upper end of the body-portion of said lever is formed an abrupt forwardly extending shoulder 25 which is engaged at times by a radial stud 26 which projects outwardly from the periphery of the casing 12, at a point about two-thirds around the casing from the arm 19, the purpose of such engagement of the stud 26 with the shoulder 25 being hereinafter explained.

27 designates the depressible platform of the trap, said platform being preferably of metal and of any suitable or preferred form and dimensions. At its middle, this platform is formed with an opening 28 which is located immediately above the bait-cavity 2, and which thus permits the animal to nibble the bait, if it has an opportunity to do so before the trap springs. From the rear side of the platform 27 extends rearwardly an arm 29 which is pivoted, by a screw 30, or an equivalent device, to the lower end of the standard 3, at one side of same and which passes transversely through the rear portion of the arm 29. Normally the front end of this arm is held in elevated position by a spring 31 which is secured to a screw 32, or an equivalent device which projects horizontally from the corresponding side of the lower end of the standard 3 below the arm 29; the said spring pressing at its front end upward beneath the arm 29, and thus normally holding the platform 27 in raised position. On its upper side, the arm 29 is formed with a shoulder 33 which is formed near the front end of said arm 29, and which is engaged by the lower end or tip 34 of the trip-lever 22; said lower end or tip 34 being bent slightly rearward so as to properly engage the shoulder 33.

Now the manner of using the trap, and the operation of the same, are as follows; in winding the trap, the operator first depresses the platform 27 with one hand and moves the tip 33 of the lever 22 backward out of engagement with the shoulder 34 of the arm 29. He now grasps the stud 20 and turns the arm 19 so as to revolve the arm and casing 12 in the opposite direction from that indicated by the arrow in Fig. 1, and continues such movement, the casing 12 correspondingly revolving, until the spring 16 is fully wound upon the spindle 7. Having completed this winding, the lower end of the lever 22 is moved forwardly so as to engage the shoulder 34 of the arm 29, and the spring 16 holds the stud 26 of the casing 12 in engagement with the shoulder 25 of the trip-lever 22, thus causing the arm 19 to project obliquely forward and downward, as shown in Fig. 1. A piece of suitable bait is now dropped into the cavity 2, and the trap is left set as described. The animal when coming to get the bait, treads upon the platform 27, depressing said platform and causing the shoulder 34 to move downward out of engagement with the tip 33 of the trip-lever 22. Instantly the spring 16 whirls the casing 12 through one complete revolution with great rapidity and force, causing the arm 19 to move in the direction indicated by the arrow in Fig. 1, and causing the outer end of said arm to sweep downwardly and forwardly over the platform 27; striking the animal a deadly blow, and throwing it clear away from the trap. After so striking the animal, the casing revolves further so as to first bring the stud 26 into engagement with the front side of the upper curved part 23 of the lever 22, moving the upper part 23 of the lever backward and the lower end or tip 33 of said lever forward into engagement with the shoulder 34 of the arm 29. The stud 26 of the casing 12 is now moved downward into engagement with the shoulder 25, and the trap is thus automatically reset in readiness to kill another animal, as soon as it springs the trap.

From the above description, it will be seen that I have produced an animal-trap which is simple, strong, durable compact, and inexpensive in construction, quick and effective in operation, and self-setting, and which is capable of repeated operations without attention.

Having thus described my invention, what I claim as new therein and desire to secure by Letters Patent is:—

1. An animal-trap, comprising a suitable standard, a revoluble casing mounted axially at the upper end of said standard and carrying a radial striking-arm, a depressible and spring elevated platform pivotally connected to the lower end of the standard, a pendent trip-lever engaging the arm of the platform, a stud carried radially by the revoluble casing and arranged to engage the upper end of the trip-lever, for tripping the same, and a spiral spring coiled within the casing and operating to revolve the same when the trap is sprung, substantially as set forth.

2. An animal-trap, comprising a suitable standard, a revoluble casing mounted axially at the upper end of the standard and carrying a radial striking arm, a spiral spring coiled within the casing and serving to revolve the same when the trap is sprung, a pendent trip-lever pivoted upon the standard, a stud carried radially by the casing and engaging the upper part of the trip-lever, and a shoulder at the upper end of the lever also engaged by the stud an arm pivoted at the lower part of the standard and provided with a shoulder engaged by the lower end of the trip-lever, a platform carried at the outer end of the arm, and a spring operating by contact with the platform-arm to retain said arm and platform normally in raised position, substantially as set forth.

3. An animal-trap, comprising a suitable standard, a fixed spindle projecting laterally from the upper end of the standard, a revoluble casing carrying a radial striking-arm and mounted axially upon the spindle, and a revolving-spring for the casing secured at its inner end to the spindle and at its outer end to the periphery of the casing, substantially as set forth.

4. An animal-trap, comprising a suitable supporting standard, a revoluble spring-actuated casing mounted at the upper end of said standard and carrying a radial striking-arm a tripping-arm pivoted upon the standard and engaging the said revoluble casing, a spring-elevated bait-platform having a bait-opening in its body-portion, a lever carrying said platform and pivoted upon the standard and also engaged by the tripping-arm, and a suitable base having a cavity to receive the bait and lying directly beneath the bait-opening of the platform, substantially as set forth.

In testimony whereof I affix my signature in the presence of two witnesses.

JOHN T. KISINGER, SR.

Witnesses:
W. D. SHELL,
PATRICK McGILLIGAN.